Dec. 20, 1932.  F. A. PARSONS  1,891,356
MILLING MACHINE
Filed Sept. 5, 1931   3 Sheets-Sheet 1

INVENTOR
Fred A. Parsons
BY
ATTORNEY

Dec. 20, 1932.　　F. A. PARSONS　　1,891,356
MILLING MACHINE
Filed Sept. 5, 1931　　3 Sheets-Sheet 2
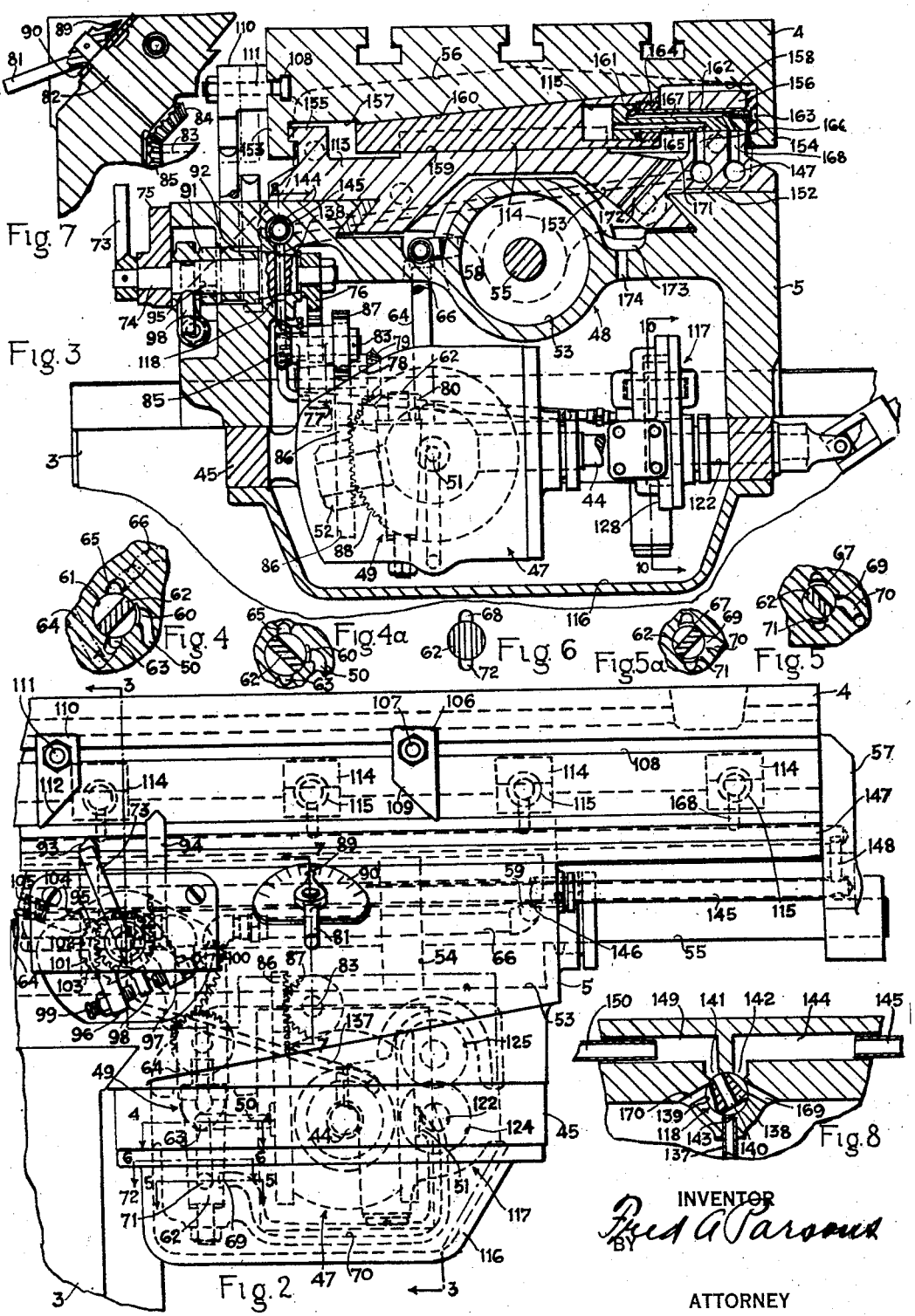
INVENTOR
Fred A. Parsons
BY
ATTORNEY Dec. 20, 1932.  F. A. PARSONS  1,891,356
MILLING MACHINE
Filed Sept. 5, 1931   3 Sheets-Sheet 3
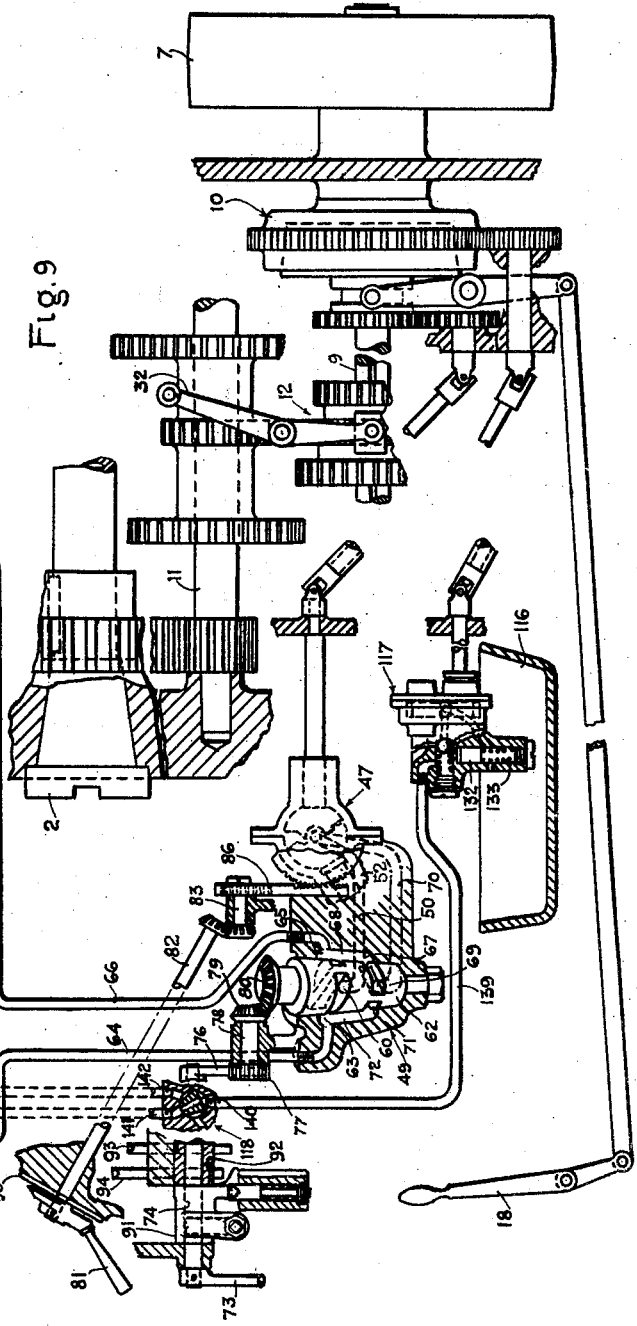
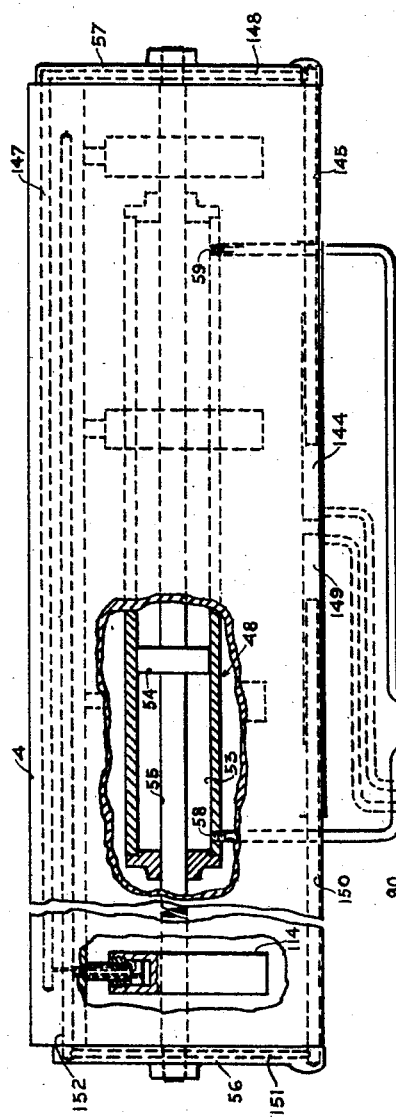
Fig. 9
INVENTOR
Fred G. Parsons
BY
ATTORNEY Patented Dec. 20, 1932

1,891,356

UNITED STATES PATENT OFFICE

FRED A. PARSONS, OF MILWAUKEE, WISCONSIN, ASSIGNOR TO KEARNEY & TRECKER CORPORATION, OF WEST ALLIS, WISCONSIN

MILLING MACHINE

Application filed September 5, 1931. Serial No. 561,332.

This invention relates to transmission and control mechanism for machine tools and more particularly for milling machines.

It is an object of the invention to provide mechanism in a machine having a reciprocatory slide as, for instance, a milling machine table for separating the work and cutter during the backward or idle part of the stroke cycle.

A further purpose relates to provision of such mechanism which is, in part at least, of hydraulic operated type.

Another purpose relates to the automatic control of the machine including the above mentioned mechanism whereby the work and cutter separation will take place, when desired, without special attention on the part of the operator.

Another object relates to an improved combination of mechanism for purposes above mentioned with other structure and mechanism of a milling machine.

Other objects relate to an improved construction for transferring of pressure fluid from one to another of different machine members whereby a source of fluid supply associated with one member may be used for operation of devices associated with another relatively movable member, particularly in connection with structure for some of the purposes previously mentioned.

Another object is generally to simplify and improve the construction and operation of milling machines, and still other objects will be apparent from the specification and claims.

The invention consists in the particular arrangement and combination of parts herein illustrated, described, and claimed, and in such modifications of the illustrated and described structure as may be equivalent to the claims.

In the drawings the same reference characters have been used for the same parts in all views.

Fig. 2 is an enlarged front elevation of a part of the machine.

Fig. 3 is a sectional view on the line 3—3 of Fig. 2.

Fig. 4 is a sectional view on the line 4—4 of Fig. 2.

Fig. 4a is a similar view showing a valve member in a different position.

Fig. 5 is a section on the line 5—5 of Fig. 2.

Fig. 5a is a similar view showing a valve member in a different position.

Fig. 6 is a section on the line 6—6 of Fig. 2.

Fig. 7 is a sectional view on the line 7—7 of Fig. 2.

Fig. 8 is a section on the line 8—8 of Fig. 3.

Fig. 9 is a schematic view in the nature of a development showing the fluid circuits.

Figure 1:
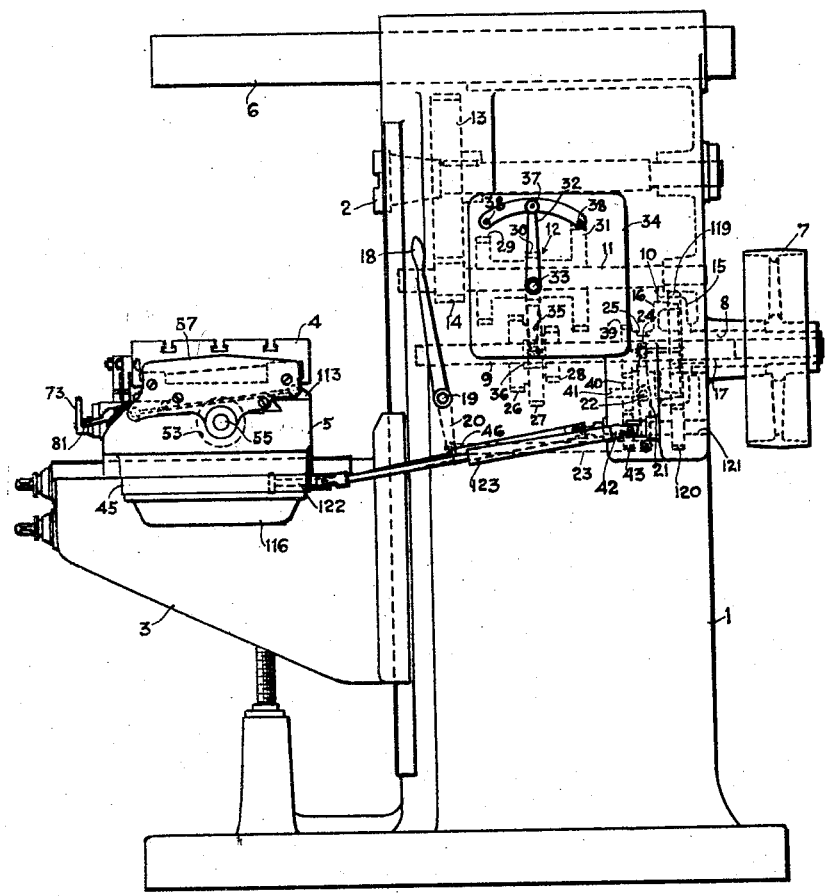
Fig. 1 is a right side elevation of a machine embodying the invention.

As shown in Fig. 1, the machine comprises a column or support 1 supporting a rotatable tool spindle or support 2 and carrying a knee or support 3 vertically adjustable on column 1 and supporting a slidable work table or support 4 through the medium of a saddle or support 5. Column 1 also supports overarms 6 and a pulley 7 constituting a power source for the machine. Spindle 2 is driven from pulley 7 as follows: Pulley 7 is fixed with and drives a sleeve 8 journaled in a suitable bearing in column 1, which drives a shaft 9 through a clutch generally denoted by numeral 10, and shaft 9 drives a shaft 11 by means of a rate changer generally denoted by numeral 12. Shaft 11 drives spindle 2 through a gear 13 fixed with spindle 2 and meshing with a pinion 14 fixed with shaft 11.

Clutch 10 comprises an outer member 15 fixed with sleeve 8 and having a conical surface adapted to frictionally engage a complementary surface on a clutch member 16 slidably keyed to shaft 9. Shaft 9 is journaled at one end in a bearing 17 formed in member 15 and sleeve 8 for maintaining shaft 9 and sleeve 8 in axial alignment to permit relative rotation thereof, and at the other end in a suitable bearing in column 1. Member 16 may be moved into and out of engagement with clutch member 15 by means of a hand lever 18 fixed with a shaft 19 journaled in a bearing in column 1 and having also fixed therewith a lever 20. Lever 20 actuates a lever 21 pivoted on a stud 22 fixed with column 1 through the medium of a link 23 pivoted at its ends to the respective levers, and lever 21 has a pivoted shoe 24 engaging a groove or spool 25 formed in clutch member 16.

Rate changer 12 comprises gears 26, 27, 28 fixed together and slidably keyed on shaft 9 and engageable one at a time with gears 29, 30, 31 fixed with shaft 11, the gears being of different sizes, whereby different speeds result in shaft 11. Gears 26, 27, 28 may be shifted on shaft 9 by means of a hand lever 32 fixed on a shaft 33 journaled in a suitable bearing in a member 34 fixed with column 1. Shaft 33 has also fixed therewith a lever 35 carrying a pivoted fork member 36 engaging the sides of gear 27, whereby movement of lever 32 will cause sliding of gears 26, 27, 28. Lever 32 has a grip portion 37 having a spring-pressed pin adapted to engage suitable holes or sockets such as 38—38 in member 34 for holding the parts in shifted position.

Table 4 is driven from pulley 7 by means of the following power train: Clutch member 16 has a gear 39 fixed therewith and meshing with an idler 40 journaled on a stud 41 fixed with column 1 and driving a shaft 42 through a gear 43 fixed thereon. Shaft 42 drives a shaft 44 journaled in a member 45 forming a part of saddle 5 by means of an extensible universal joint shaft 46 coupled with the respective shafts. Shaft 44, Figs. 2 and 3, drives a fluid pump 47 which supplies fluid to a fluid motor 48 through a reverser valve generally denoted by numeral 49.

Pump 47 may be of any suitable type, but in this instance is of a type as disclosed in the patent to Edward J. Kearney, No. 1,678,050, July 24, 1928. Since the pump forms no part of the present invention and since many other pumps of similar type might be used with satisfactory results, no further description of the pump is considered necessary except to observe that it is driven by means of a shaft 44, Figs. 2 and 3, has outlet and inlet ports 50 and 51 respectively, and an adjustable portion 52 which may be moved about an axis transverse to shaft 44, as indicated, to alter the capacity of the pump.

Fluid motor 48 comprises a cylinder 53, Figs. 2, 3, and 9, fixed with saddle 5 and having a piston 54 slidably fitted therein for movement to the right and left, the piston being fixed with a piston rod 55 extending outside of cylinder 53 through suitable packings and fixed with brackets 56, 57 fixed with table 4. Cylinder 53 is provided with ports 58 and 59 for access of fluid to the cylinder.

As shown in Figs. 2 and 9, pump 47 has a discharge passage 50 leading to reverser valve 49 and communicating with a port 60 entering bore 61 thereof, Fig. 4, at an upper level. A rotatable plug 62 is fitted in bore 61 and has cut-away portions, as particularly shown in Figs. 4, 5, and 9. A port 63 enters bore 61 at a point to one side of passage 50 and connects with a duct 64, Figs. 2, 3, 4, and 9, leading to port 58 of fluid motor 48. Another port 65 enters bore 61 at a point substantially opposite port 63 and connects with a duct 66 leading to port 59 of fluid motor 48. Thus with plug 62 in the position shown in Figs. 4 and 9, fluid coming from pump 47 through passage 50 will be forced to pass through port 63 and duct 64 to the left end of cylinder 53. Port 65 communicates with a port 67, Figs. 2, 5, and 9, through a groove 68, Fig. 6, communicating with duct 66 and forming a continuation of port 65. A port 69, Figs. 5 and 9, leads from bore 61 adjacent port 67 through a duct 70 to the intake port of pump 47. Another port 71 enters bore 61 at a point substantially opposite port 67 and communicates with port 63 through a groove 72, Figs. 4, 5, 6, and 9. Admission of fluid from passage 50 through port 63 and duct 64 to the left end of cylinder 53 will accordingly cause motion of piston 54 to the right in Figs. 2 and 9, and fluid in the right end of cylinder 53 will be forced by such motion through duct 66 to groove 68, Figs. 4, 6, and 9, and from groove 68 to port 67 and bore 61 to port 69, thence through duct 70 to pump 47. It will then pass through the pump and through passage 69 to the left end of cylinder 53, as above outlined.

As indicated in Figs. 4 and 5, ports 60, 67, and 71 are sufficiently enlarged to prevent blocking thereof by portions of valve member 62.

If plug 62 were rotated through an angle of 90 degrees in a clockwise direction as seen in Figs. 4, 5, and 9, fluid would pass from passage 50 through port 65 and duct 66 to the right end of cylinder 53, whereby piston 54 would move to the left and force fluid from the left end of cylinder 53 through duct 64, groove 72, port 71, port 69, and duct 70 to the intake port of pump 47.

For so shifting plug 62 a hand lever 73 is provided fixed on a shaft 74 journaled in a bracket 75 and having also fixed therewith a gear segment 76. Segment 76 meshes with a gear 77 fixed on a shaft 78 journaled in a suitable bearing in member 45 and having fixed therewith a bevel gear 79 meshing with a bevel gear 80 fixed with valve plug 62.

The output of pump 47 is adjustable for varying the rate of travel of table 4 by changing the position of member 52, and this may be done by means of a hand lever 81, Figs. 2, 7, and 9, fixed with a shaft 82 journaled in saddle 3 and connected to shaft 83 through bevel gears 84 and 85 fixed with the respective shafts. Shaft 83 actuates a rack 86 vertically slidable in member 45 by means of a gear segment 87 fixed with shaft 83. Rack 86 engages a segment 88 fixed with member 52, whereby vertical motion of rack 86 will cause angular displacement of member 52 and consequent variation in the output of pump 47. Hand lever 81 has a pointer 89 fixed therewith and indicating against a scale 90 fixed with saddle 5 the position of the parts and accordingly the rate of travel of table 4.

Table 4 may be selectively automatically reversed or stopped at either end of its movement by means of a trip device actuated by table dogs, the trip device comprising a sleeve member 91 journaled on shaft 74, Figs. 3 and 9, and having gear teeth 92 engaging suitable rack teeth formed in plungers 93 and 94 vertically slidable in saddle 5. Sleeve 91 also has a cam 95, Fig. 2, fixed therewith, and lugs 96, 97 constituting part of a lost motion device. A pin 98 is fixed with shaft 74 between lugs 96 and 97 for engagement with screws 99, 100 threaded through the respective lugs. Cam 95 has a central notch 101 and surfaces 102 and 103 at either side thereof, and a plunger 104 is pressed by a spring 105 against cam 95.

Shaft 74 and sleeve 91 actuate each other through the engagement of pin 98 with screws 99 and 100 and lost motion may be provided at this point by suitable adjustment of screws 99 and 100. Accordingly, if no lost motion is provided and handle 73 is moved to the left, as shown in Fig. 2, sleeve 91 will be rotated in a counterclockwise direction, cam 95 will be moved so that plunger 104 will be in engagement with surface 102, plunger 93 will be lowered through engagement with gear 92, and plunger 94 will be raised. Valve plug 62 will be moved to the position to admit fluid to duct 66, as shown in Fig. 4a, and table 4 will move to the left. At a predetermined point in the travel of table 4 plunger 94 will be contacted by a dog 106 fixed with table 4 by means of a bolt 107 engaging a suitable T-slot 108 in table 4 and having a cam surface 109 adapted to depress plunger 94. Such motion of plunger 94 will rotate gear 92, cam 95, and through the engagement of screws 99, 100 with pin 98, shaft 74 in a clockwise direction. Such rotation of shaft 74 will cause counterclockwise rotation of valve plug 62 which will continue until valve plug 62 has reached a mid-position, when fluid coming from passage 50 will pass into both ports 63 and 65 and by-pass through grooves 68 and 72 to ports 67 and 71, Figs. 5, 5a, finding its way to port 69 and back to pump 47 through duct 70, whereupon the table will stop.

If, however, lost motion is provided between pin 98 and screw 100, shaft 74 will lag slightly behind sleeve 91 when dog 106 depresses plunger 94 and accordingly valve plug 62 will not reach such mid-position at the time plunger 104 reaches central notch 101. Table 4 will accordingly continue to move until plunger 104 is forced out of notch 101, whereupon plunger 104 will act upon surface 103 of cam 95 and move it to the limit of its travel in a clockwise direction, and, through the engagement of pin 98 with screw 100, will rotate shaft 74 sufficiently to shift valve plug 62 into the position shown in Figs. 4 and 5 to cause table 4 to move to the right.

Such motion of sleeve 91 will raise plunger 93 and lower plunger 94. At a predetermined point in travel of table 4 a dog 110 fixed with table 4 by means of a bolt 111 engaging T-slot 108 will contact plunger 93 by means of a cam surface 112 and depress the same. Such motion of plunger 93 will rotate gear 92 in a counterclockwise direction and, through engagement of screw 99 with pin 98, will turn shaft 74 in a counterclockwise direction. As above outlined, if screw 99 is so adjusted that cam 95 and valve plug 62 will reach a central position at the same time, table 4 will come to a stop at this point, while if suitable lost motion is provided, table 4 will reverse and take up a cycle of left and right movements.

Under certain conditions it is desirable to cause table 4 to drop slightly upon movement in one direction, such as upon return movement after a cut. This is accomplished in the following manner: Table 4 is supported on a supplementary member 113 slidably supported on saddle 5, guided for a small amount of vertical movement relative thereto and supported thereon by means of a plurality of wedge devices 114—114 which may be simultaneously moved to the right or left in Fig. 3 by means of hydraulic pressure acting in cylinders 115—115 supplied with fluid from a reservoir 116 by means of a pump 117, Fig. 10. The movement is controlled in unison with the reversing of table 4 by means of a valve device 118.

Pump 117 is driven from pulley 7 by means of a gear 119 fixed with clutch member 15 and meshing with a gear 120 fixed with a shaft 121 journaled in suitable bearings in column 1. Shaft 121 drives a pump shaft 122 journaled in member 45 through the medium of an extensible universal joint shaft 123 coupled with the respective shafts.

Figure 10:
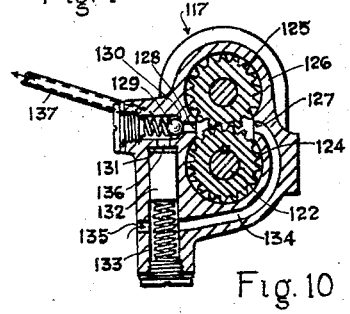
Fig. 10 is a sectional view on the line 10—10 of Fig. 3.

Pump 117 may be of any suitable type, but in the present instance comprises gears 124, 125, Figs. 2, 10, meshed together within a suitable fluid-tight casing 126 fixed with member 45 and providing an inlet port 127 and an outlet port 128. Port 128 leads through a check valve comprising a ball member 129 pressed against a seat 130 formed in port 128 into an accumulator cylinder 131 having a piston 132 slidably fitted therein and pressed upwardly by a spring 133. Inlet port 127 communicates with a passage 134 entering cylinder 131 at a point below piston 132, and a port 135 communicates from a point substantially opposite port 127 with reservoir 116, whereby when piston 132 is depressed by an accumulation of fluid thereabove, passage 134 will be blocked by piston 132 and fluid will be prevented from passing to pump 117 through port 127. Since the check valve member 129 prevents back pressure on the pump, and no fluid is pumped except as required, pump 117 will be relieved from load at such times as there is no demand for fluid to maintain the fluid pressure in accumulator cylinder 131. Cylinder 131 has an outlet port 136 and a duct 137 leads therefrom to valve 118.

Valve 118, as shown in Figs. 3 and 8, comprises an enlarged portion 138 of shaft 74 fitted in a bore 139 and having a port 140 therethrough. Portion 138 has cut-away portions, as particularly shown in Fig. 8, for cooperation with ports 141, 142 entering bore 139 at either side of a vertical plane through the center of shaft 74, and another cut-away portion designed to provide communication at all times between a port 143 communicating with duct 137 entering bore 139 in such a plane from below port 140. Port 142 communicates with cylinders 115—115 through a passage 144 formed in saddle 5 and connecting with a pipe 145 slidable in said passage, leakage between the two being prevented by suitable packing 146, Fig. 2, and pipe 145 communicating with a passage 147 formed in member 113 through a duct 148 formed in bracket 57. Port 141 communicates with a passage 149 in which is slidable a pipe 150, Figs. 8, 9, communicating with a duct 151 formed in bracket 56 which in turn communicates with a passage 152 formed in member 113 substantially parallel to passage 147. Table 4 is limited in its upward movement by engagement of downwardly projecting edge portions 153 and 154, Fig. 3, engaging with upwardly projecting portions 155 and 156 on member 113, suitable abutment faces being provided on the respective members and serving to correctly locate table 4 with respect to member 113 when in its raised position. In its lowered position surfaces 157 and 158 on table 4 rest on members 155 and 156, respectively, thereby determining the extent of downward travel of table 4. The wedges 114—114 move to right and left in Fig. 3 between surfaces 159—159 on member 113 and 160—160 on table 4.

For moving wedges 114—114 cylinders 115—115 are provided formed therein. Each cylinder has a relatively stationary piston 161 fixed on a rod 162 and held in a bore formed in projection 156 by means of a screw 163 threaded through projection 156 into rod 162. A head 164 is threaded into cylinder 115 slidable on rod 162 whereby to close the end of the cylinder. Rod 162 has a port 165 communicating with the space to the left of piston 161 and registering with a bore 166 in projection 156 communicating with passage 152, and a port 167 communicating with the space to the right of piston 161 and registering with a bore 168 communicating with passage 147, whereby pressure admitted to passage 152 will cause wedge 114 to move to the left in Fig. 3, while pressure admitted to passage 147 will cause wedge 114 to move to the right in Fig. 3.

The admission of pressure from pump 117 through passages 147 and 152 is controlled by means of valve 118 as follows: Valve member 138 is turned by movement of shaft 74 which also controls the reverse and stop of the table as previously explained. If valve member 138 is placed in the position shown in Figs. 8 and 9, fluid will be admitted from pump 117 through duct 137, bore 140, port 141, passage 149, pipe 150, duct 151, passage 152, bore 166, and passage 165 to the left end of cylinder 115, thereby forcing wedges 114—114 to the left in Fig. 3 and raising table 4 to its uppermost position ready for feed travel to the left in Fig. 2. Fluid in the right end of cylinder 115 will be forced out through passage 167, bore 168, passage 147, duct 148, pipe 145, passage 144 to bore 139 and, through a port 169, discharged to reservoir 116. At the same time reverser valve 49 will be moved to position to cause such feed movement of table 4.

When shaft 74 is moved to reverse the travel of table 4, valve plug 138 will be turned therewith to cause communication of bore 140 with port 142, whereupon fluid will be admitted from passage 137 to port 142 and will pass through passage 144, pipe 145, duct 148, passage 147, bore 168, and port 167 to the right end of cylinder 115, moving wedges 114—114 to the right and dropping table 4 ready for return movement. At this time fluid will be returned from the left end of cylinder 115 through port 165, passages 152 and 151, pipe 150, passage 149, and port 141 and returned to reservoir 116 through a port 170.

For disposing of any leakage of fluid around rod 162 a chamber 171 is provided in member 113 and a bore 172 leads therefrom to a chamber 173 in saddle 5. A bore 174 leads from chamber 173 to return such fluid as reaches chamber 173 to reservoir 116.

The above being a full and complete description of an illustrative embodiment of the invention, what is claimed is:

1. In a milling machine, the combination of a rotatable tool spindle, a support for said spindle, a work support adjacent said spindle, said supports being relatively movable in a first path transverse to the axis of said spindle for forward direction cutting movements and reverse direction idle movements, one of said supports being movable in a second path transverse to said first path to an advanced cutting position or alternatively to a retracted non-cutting position, a spindle transmission, a transmission for said relative movement in said first path driven from said spindle transmission and including a reverser operable for said forward and reverse movements, a power train for movement of said movable support in said second path including a fluid operable device oppositely movable to two positions respectively corresponding to different of said positions of said movable support, a power operated pump, channels connectible from said pump for operation of said device to each of said positions thereof, valve means associated with said channels and having two positions respectively for movement of said device to the different positions thereof, and means for operation of said valve means in accordance with said forward and reverse movement.

2. In a milling machine, the combination of a rotatable tool spindle, a support for said spindle, a work support adjacent said spindle, said supports being relatively movable in a first path transverse to the axis of said spindle for forward direction cutting movements and reverse direction idle movements, one of said supports being movable in a second path transverse to said first path to an advanced cutting position or alternatively to a retracted non-cutting position, a spindle transmission, a transmission for said relative movement in said first path driven from said spindle transmission and including a reverser operable for said forward and reverse movements, a trip device connected for operation of said reverser, means for operation of said trip device in accordance with said forward and reverse movement, a power operated pump, a fluid operable device connectible with said pump for movement of said movable support in said second path alternately to different of said positions thereof, valve means controlling said alternate connection of said fluid operable device, and motion transmitting connections from said trip device to said valve means, whereby to position said valve means for effecting said cutting position of said movable support during said forward movement and vice versa.

3. In a milling machine, the combination of a rotatable tool spindle, a support for said spindle, a work support adjacent said spindle, said supports being relatively movable in a first path transverse to the axis of said spindle for forward direction cutting movements and reverse direction idle movements, one of said supports being movable in a second path transverse to said first path to an advanced cutting position or alternatively to a retracted non-cutting position, a spindle transmission including a rate changer, a transmission for said relative movement in said first path including a pump driven from said spindle transmission to exclude said rate changer, a reversibly fluid operable motor, channels connectible from said pump for operation of said motor in either direction and reverser valve means associated with said channels, a reversibly fluid operable device operable for movement of said movable support in said second path to the one or the other of said positions thereof, a source of pressure fluid for said device, valve means controlling the connection of said fluid source and said device, and automatic trip mechanism connected for movement of said reverser valve and of said valve means in accordance with said relative movement.

4. In a milling machine, the combination of a rotatable tool spindle, a support for said spindle, a work support adjacent said spindle, said supports being relatively movable in a first path transverse to the axis of said spindle for forward direction cutting movements and reverse direction idle movements, one of said supports being movable in a second path transverse to said first path to an advanced cutting position or alternatively to a retracted non-cutting position, a spindle transmission, a transmission for said relative movement in said first path including a reverser having a plurality of positions respectively for said forward and reverse movement and having an intermediate position operative for interrupting said relative movement, a reversibly fluid operable device, a power driven pump, channels connectible for said pump for operation of said device, motion transmitting connections from said device and operable for the different directions of movement thereof respectively to move said movable support in said second path to the one or the other of said positions thereof, valve means associated with said channels and having a plurality of positions respectively operable for movement of said device in different directions, a trip device connected for movement of said reverser and alternatively operable for movement thereof from the one to the other of said plurality of positions or to said intermediate position, automatic means for operation of said trip device in accordance with said relative movement, and a motion transmitting connection from said trip device to said valve means.

5. In a milling machine, the combination of a rotatable tool spindle, a support adjacent said spindle and reciprocable in a path transverse to the spindle axis for forward cutting movement or for reverse non-cutting movement, a work table supported from said support for movement therewith in said path and movable relative thereto to a cutting position and alternatively to a non-cutting position, transmission mechanism for rotation of said spindle and for said movement of said support, a power train for movement of said table to the one or the other of said positions including a mechanical device shiftable in opposite directions respectively determinative of different of said positions, a power driven pump, a reversibly fluid operable device connected for operation of said mechanical device, channels connectible for operation of said fluid operable device in either direction from said pump, valve means controlling the connection of said channels, a dog operable trip device connected for operation of said valve means, and dog means for movement of said trip device in accordance with the movement of said support in said path.

6. A milling machine as specified in claim 5 in which said pump is stationary with respect to said movement and in which portions of said channels are associated with said support, and including structure adapted to maintain a closed fluid conduit from said pump to said channel portions during said support movement.

7. In a milling machine, the combination of a column, a spindle rotatably supported therefrom, a knee supported from said column for vertical movement, a work table carried by said knee for reciprocatory movement in a path transverse to said spindle and in a forward cutting direction and a reverse non-cutting direction in said path, and for other movement to a cutting position and to a non-cutting position, a power source associated with said column, a spindle transmission driven from said source and including a spindle rate changer, a first transmission for said table driven from said spindle transmission to exclude said rate changer and including a reverser alternatively operable for said forward and reverse movements, a second transmission for said table driven from said source to exclude both said rate changer and said reverser and including a pump, a fluid operable device connectible for table movement alternatively to the one or the other of said positions, channels connectible from said pump for operating said device to effect said alternative table positions, and valve means associated with said channels and controlling the said connection thereof, said pump, device, and valve means being unitarily vertically movable with said knee.

8. In a milling machine, the combination of a rotatable tool spindle, a work table adjacent said spindle and movable in a first path of cutting movement in a plane having a predetermined spacing from the axis of said spindle, said work table being also movable in a second path adapted to change said spacing, a first train for movement of said table in said first path and including a pump and a fluid operable motor, said train likewise including reversing and rate change means, and a second train for movement of said table in said second path including a mechanical device alternatively movable to two positions one of which determines said spacing, a second fluid operable motor reversibly movable and connected for operation of said mechanical device, a source of fluid supply for said second motor, a valve controlling the fluid supplied to said second motor from said source, dog operable means for shifting said valve, and dogs operative in accordance with the movement of said table in said first path for operation of said dog operable means.

In witness whereof I have hereto affixed my signature.

FRED A. PARSONS.